(12) United States Patent
Choi

(10) Patent No.: US 7,324,277 B2
(45) Date of Patent: Jan. 29, 2008

(54) BOTH-SIDE IMAGE FILM SCREEN

(76) Inventor: Hae-Yong Choi, Mookdong I Park Apartment #108-301, 385 Mook-dong, Jungryang-gu, Seoul-city (KR) 131-768

( * ) Notice: Subject to any disclaimer, the term of this patent is extended or adjusted under 35 U.S.C. 154(b) by 132 days.

(21) Appl. No.: 10/527,715

(22) PCT Filed: Oct. 17, 2003

(86) PCT No.: PCT/KR03/02172

§ 371 (c)(1),
(2), (4) Date: Mar. 11, 2005

(87) PCT Pub. No.: WO2004/036310

PCT Pub. Date: Apr. 29, 2004

(65) Prior Publication Data
US 2006/0012876 A1    Jan. 19, 2006

(30) Foreign Application Priority Data
Oct. 21, 2002   (KR) .................... 10-2002-0065041

(51) Int. Cl.
G03B 21/60 (2006.01)
G03B 21/56 (2006.01)

(52) U.S. Cl. .................... 359/452; 359/453; 359/454; 359/459; 359/460; 359/461

(58) Field of Classification Search .................. 359/443, 359/452–454, 459–461
See application file for complete search history.

(56) References Cited

U.S. PATENT DOCUMENTS

| 4,323,301 A | * | 4/1982 | Spector | 359/443 |
| 5,274,499 A | * | 12/1993 | Shopp | 359/461 |
| 5,456,967 A | * | 10/1995 | Nezu | 428/141 |
| 6,064,521 A | * | 5/2000 | Burke | 359/443 |
| 6,076,933 A | * | 6/2000 | DiLoreto et al. | 359/614 |
| 6,556,347 B1 | * | 4/2003 | Murayama et al. | 359/453 |
| 2001/0005243 A1 | * | 6/2001 | Yamaguchi | 349/61 |
| 2003/0107803 A1 | * | 6/2003 | Tanaka et al. | 359/460 |
| 2003/0163367 A1 | * | 8/2003 | Piepel et al. | 705/14 |

FOREIGN PATENT DOCUMENTS

KR      1989-0013883       9/1989

(Continued)

Primary Examiner—Diane I. Lee
Assistant Examiner—Magda Cruz
(74) Attorney, Agent, or Firm—Bacon & Thomas, PLLC

(57) ABSTRACT

Disclosed is a double-sided image film screen including a plastic material having a high optical transmission property and a light-refracting material, made of silica, having an optical transmission property and a refractivity of 1.4~2.5, wherein a content and a particle size of the light-refracting material and a thickness of the film screen are designated such that an image incident on the film screen by means of light projected from a projector is dividedly displayed on front and rear surfaces of the film screen, thereby displaying the image formed thereon though the front and rear surfaces thereof, increasing the visibility of the image and eliminating a hot spot generated by a projection light source of the projector. Compared to conventional screens, the double-sided image film screen is advantageous in that it displays the image through the front and rear surfaces thereof.

7 Claims, 7 Drawing Sheets

| | FOREIGN PATENT DOCUMENTS | | WO | WO99/64928 A | 12/1999 |
|---|---|---|---|---|---|
| KR | 10-1989-0017296 | 11/1989 | WO | WO00/38005 A | 6/2000 |
| KR | 10-2000-0050590 | 8/2000 | | | |
| WO | WO98/45753 A | 10/1998 | * cited by examiner | | |

(a)

(b)

(a)

(b)

(c)

BOTH-SIDE IMAGE FILM SCREEN

TECHNICAL FIELD

The present invention relates to a projection screen, and more particularly to a double-sided image film screen, which dividedly displays an image formed thereon, by means of light projected from a projector, through front and rear surfaces of the screen so that the film screen serves as a front screen, a rear screen and a double-sided screen, which is made of a thin film so that the film screen serves as a roll screen, which is provided with a reflection plane so that the film screen serves as a reflection-type screen having a high brightness, and which eliminates afterglow of the projected light, thus maintaining uniform brightness of the image and providing high visibility of the image.

BACKGROUND ART

Conventional screens are divided into transmission-type screens and reflection-type screens. As shown in FIG. 1, a conventional transmission-type screen comprises a front transparent surface, and a rear scattering surface made of a thin film. As shown in FIG. 2, a conventional Fresnel transmission-type screen comprises a Fresnel lens installed at a front surface, and a real vertical curved surface, thereby transmitting light through the front surface serving as an incidence plane (D) and diffusing an image through the rear surface serving as an exit plane (E). Thus, the Fresnel transmission-type screen displays the image through the exit plane (E). However, since light is incident on the incidence plane (D) of the Fresnel transmission-type screen, it is impossible to display the image through both surfaces, i.e., front and rear surfaces of the screen.

Further, since the above-described conventional screens have a sheet structure made of a hard material, it is difficult to roll the screens or to transfer and/or store the screens.

Accordingly, in order to allow the conventional screens to display an image through both surfaces thereof, the screen requires two sub-screens, i.e., front and rear screens, and two projectors, i.e., front and rear projectors.

Moreover, as shown in FIG. 3, in case that the conventional transmission-type screen 8 is has a high transmittance in order to increase the brightness of the transmission-type screen 8, a beam of light projected from a projector 5 located adjacent to a rear surface of the transmission-type screen 8 is transmitted through the transmission-type screen 8 and is then exposed to the outside, thus generating a hot spot (F), such that an area around a light source lamp 7 through a projection lens 6 is more brighter than other peripheral areas. The above hot spot (F) is generated also in a reflection-type screen. The generation of the hot spot (F) is proportional to the reflectance of the screen. Thus, in case that the screen has a higher reflectance, the hot spot (F) has an increased size throughout the screen, thereby deteriorating the uniformity of the brightness of an image formed on the screen. Accordingly, there has been required a technique for eliminating the generation of the hot spot (F).

More specifically, in the transmission-type screen 8 as shown in FIG. 3, the projection lens 6 of the projector 5 located adjacent to the rear surface of the transmission-type screen 8 faces the transmission-type screen 8. Here, a light source of the light source lamp 7 within the projection lens 6 of the projector 6 is viewed through the projection lens 6, and the light source is projected onto the transmission-type screen 8. Thus, viewers view both the light source of the light source lamp 7 and an image formed the transmission-type screen 8. That is, there is generated the hot spot (F) such that a central area of the screen is brighter than other peripheral areas of the screen. Thereby, the brightness of the screen 8 is not uniform.

Since viewers view the light source of the light source lamp 7 by reflection of a reflection-type screen, such a hot spot (F) is generated also in the reflection-type screen.

DISCLOSURE OF THE INVENTION

Therefore, the present invention has been made in view of the above problems, and it is an object of the present invention to provide a double-sided image film screen comprising a transparent material such as polyester and a light-refracting material such as silica contained in the transparent material, in which an image is dividedly displayed on front and rear surfaces of the screen.

It is another object of the present invention to provide a double-sided image film screen, which is attached to a glass window as shown in FIG. 11 so that the screen displays an image through front and rear surfaces thereof outdoors and indoors simultaneously, which is installed at a ceiling as shown in FIG. 12 so that moving people view an image formed on the screen through the front and rear surfaces thereof, which is rolled up and down so that the screen has a rolled structure, which is assembled into one projection system as shown in FIG. 13 so that the screen displays the image through the front and rear surfaces thereof, each of the screen systems as shown in FIGS. 11, 12 and 13 which comprises one screen and one projector displaying the image having a high visibility through both surfaces thereof, and which eliminates a hot spot (F) generated by light of a projection lens of a projector as shown in FIG. 6 so that the screen displays the image having uniform visibility even if the screen is applied to a reflection-type flat screen having a high brightness.

In accordance with the present invention, the above and other objects can be accomplished by the provision of a double-sided image film screen having a projection structure, comprising: a transparent material made of one selected from the group consisting of polyester, acryl and polycarbonate; and a light-refracting material, made of silica, contained in or deposited on the transparent material, wherein a content and a particle size of the light-refracting material and a thickness of the film screen mutually interact so that an image formed on the film screen by means of light projected from a projector is dividedly displayed through front and rear surfaces of the film screen and afterglow of light projected from a distant projector is eliminated, thereby displaying the image having a high visibility through the front and rear surfaces thereof and eliminating a hot spot.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
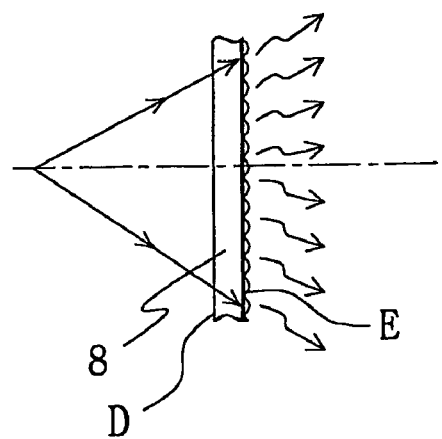
FIG. 1 is a schematic view of a conventional transmission-type screen.

Now, constitution and function of the present invention will be simultaneously described in detail with reference to the annexed drawings for a better understanding of the present invention.

A transparent material 3, which is produced into a thin film, is made of polyester, acryl, or polycarbonate having a good transmittance and the same manufacturing process. In the present invention, the transparent material 3 is made of a polyester film, and a light-refracting material 2 is made of silica 2A.

The silica 2A has the chemical formula $SiO_2$ and a refractivity of 1.4 or more, and is referred to as "silicon dioxide".

The silica 2A having a high purity has a high optical transmittance, and is applied to manufacture optical fibers for optical communication. In case that the silica 2A has an excessively small particle size of less than 0.1 μm, the silica 2A cannot have optical function. On the other hand, in case that the silica 2A has a particle size of more than 0.1 μm, the silica 2A has optical function such as optical transmittance and refractivity.

Polyester among the above-described materials of the transparent film 3 has a high transparency, a high surface flatness, and a high brilliance.

Further, there has been already disclosed a process for manufacturing a sheet for a film, comprising the steps of ester-interchanging Terephthalic Acid (TPA), Dimethyl Terephthalate (DMT) and Ethylene Glycol (EG) in a normal pressure and high temperature state even under a high humidity condition, melting a polyester resin serving as a raw material of the film by polymerizing them in a high vacuum and high temperature state, and forming the sheet made of the polyester resin by means of a die. Here, fine optical crystalline granules such as silica 2A are mixed with the polyester resin.

As described above, the silica 2A is contained by the transparent material 3 such as polyester, and is then produced as a thin film screen plane on which transmitted light is refracted and displayed through front and rear surfaces.

The silica 2A without cohesion cannot be produced as a film structure for a screen. Accordingly, polyester resin having cohesion and solubility is used as a base mixed with the light-refracting material 2 such as the silica 2A, thereby being produced as a thin film.

In this case, since the silica 2A, which has a particle size having refraction and transmission properties, is mixed with the polyester film having a good transmittance, incident light is refracted into fine units by the silica 2A so that the light can be diffused without reduction of the intensity of light.

A content (C) of the silica 2A in the polyester film affects the refraction and transmission of light. Further, a thickness (A) of the polyester film screen 1 containing the silica 2A affects the transmittance of light. Accordingly, the content (C) of the silica 2A in the polyester film and the thickness (A) of the polyester film screen 1 are factors determining the double-sided display function of the film screen 1.

A particle size (B) of the silica 2A affects the resolution of a transmitted image in the film screen 1 and the display of the image through both surfaces of the film screen 1.

Accordingly, the content (C) and the particle size (B) of the light-retracting material 2 such as the silica 2A of the film screen 1 and the thickness (A) of the film screen 1 containing the light-refracting material 2 are leading factors determining double-sided image displaying.

Hereafter, preferred embodiments of the present invention will be described in detail.

Figure 4:
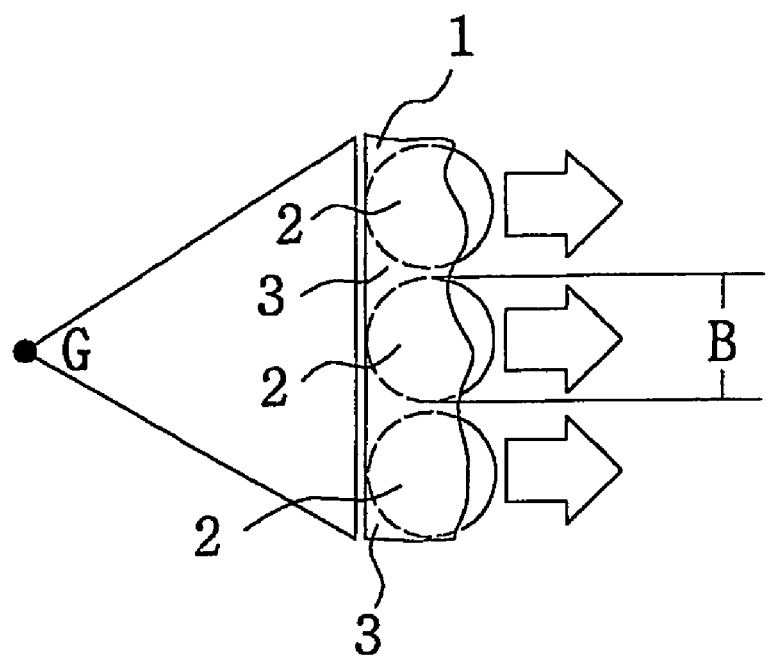
FIGS. 4a and 4b are schematic views of a double-sided image film screen in accordance with the present invention.
Figure 4:
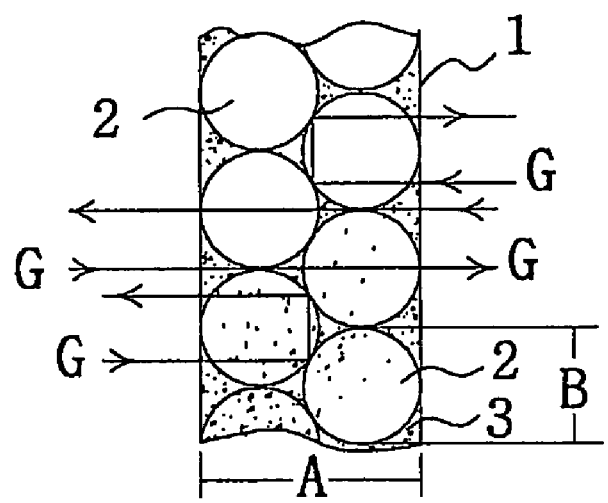

As shown in FIG. 4a, light (G) incident on the overall surface of the film screen 1 is transmitted into units having the same size as the particle size (B) of the silica 2A, and refracted into these units, thereby being diffused. In case that the particle size (B) of the silica 2A is in the range of 0.1 μm to 50 μm, the refractivity is increased to 1.4 to 3 so that light is simultaneously refracted and transmitted, thereby causing identical effects such as scattering.

That is, the finer the particle size of the silica 2A become, the finer the transmission/refraction units of the light by the silica 2A are. Thereby, the optical scattering without optical loss due to transmission is obtained.

Figure 5:
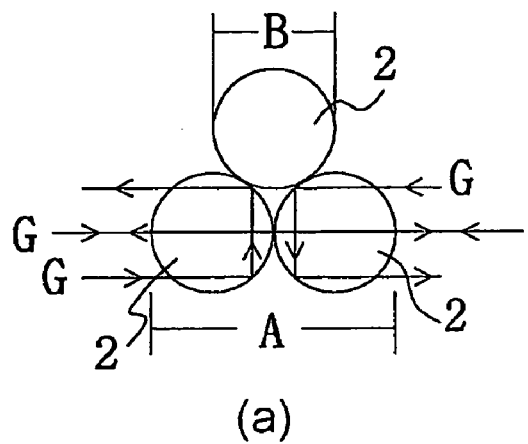
FIGS. 5a to 5c are schematic views illustrating function of silica in the double-sided image film screen in accordance with the present invention.
Figure 5:
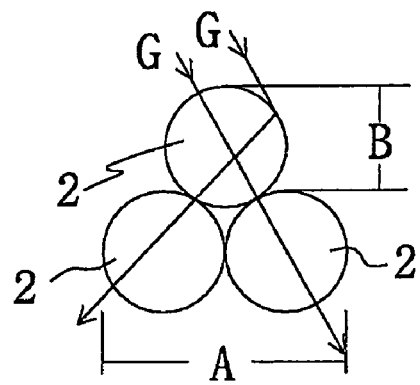
Figure 5:
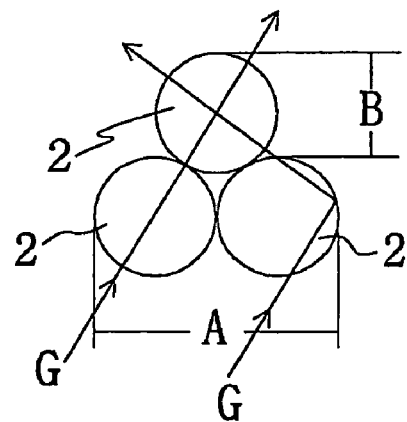

The incident light on the film screen is transmitted and refracted which by the particle units of the silica 2A having the particle size (B) as shown in FIG. 5b.

That is, as shown in FIGS. 4b and 5a, a portion of light incident on the central area of each of the particles of the silica 2A at the front surface of the film screen 1 is transmitted to a straightly forward direction, and a portion of light incident on an upper or lower end of each of the particles of the silica 2A at the front surface of the film screen 1 is reflected by the particle of the silica 2A due to the refractivity of the silica 2A, thus causing the light to be dividedly directed to both surfaces, i.e., the front and rear surfaces of the film screen 1.

By the same principle, a portion of light incident on the central area of each of the particles of the silica 2A at the rear surface of the film screen 1 is transmitted to a straightly forward direction, and a portion of light incident on an upper or lower end of each of the particles of the silica 2A at the rear surface of the film screen 1 is reflected by the particle of the silica 2A due to the refractivity of the silica 2A, thus eliminating a hot spot (F) generated by a light source 7 of a distant projector 5.

As shown in FIG. 5b, in case that light is incident on the film screen 1 at a downwardly oblique angle, a portion of light incident on the central area of each of the particles of the silica 2A is transmitted to a straightly forward direction, and a portion of light incident on an upper or lower end of each of the particles of the silica 2A is reflected by the particle of the silica 2A due to the refractivity of the silica 2A, thus causing the light to be dividedly directed to left and right sides.

As shown in FIG. 5c, in case that light is incident on the film screen 1 at an upwardly oblique angle, the light is dividedly directed to left and right sides by the same principle.

Accordingly, since light from one direction incident on the film screen 1 is refracted by the particles of the silica 2A having the particle size (B) to front, rear, left and right directions and diffused, a wide viewing angle of the film screen 1 is obtained.

More specifically, the above light division into the front and rear surfaces of the film screen 1 results from the refractivity of the silica 2A. In case that the refractivity of the silica 2A is 1.0, light is transmitted by the silica 2A, thus allowing the film screen 1 serving as only a transmission-type screen. On the other hand, in case that the refractivity of the silica 2A is 1.4 or more, light is double-refracted toward the front and rear surfaces of the film screen 1 by birefringence of the silica 2A, thus allowing a resulting image to be dividedly displayed on both surfaces of the film screen 1.

Differing from light scattering generated by reflection on a surface of a conventional screen, light is diffused by the above-described refractivity of the silica 2A. Thereby, the image is dividedly displayed on the front and rear surfaces of the film screen 1. Although the imaged is displayed on both surfaces of the film screen 1, since the incident light has a low loss, there is no loss in brightness of the image.

Figure 3:
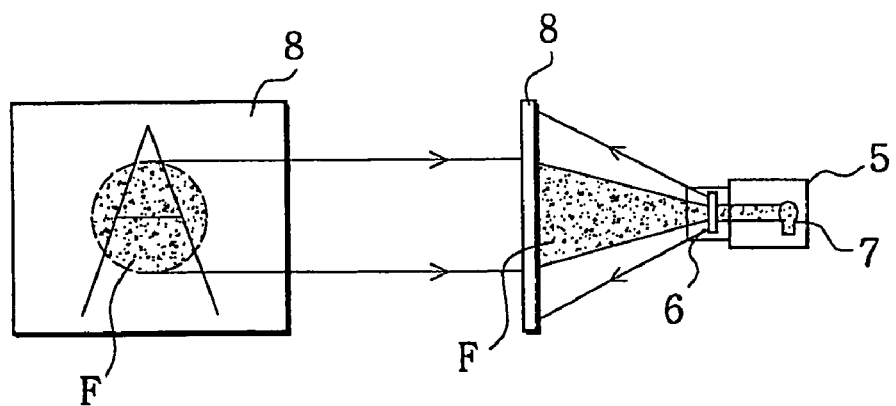
FIG. 3 is a schematic view illustrating afterglow from a projection light source of the conventional transmission-type screen.
Figure 6:
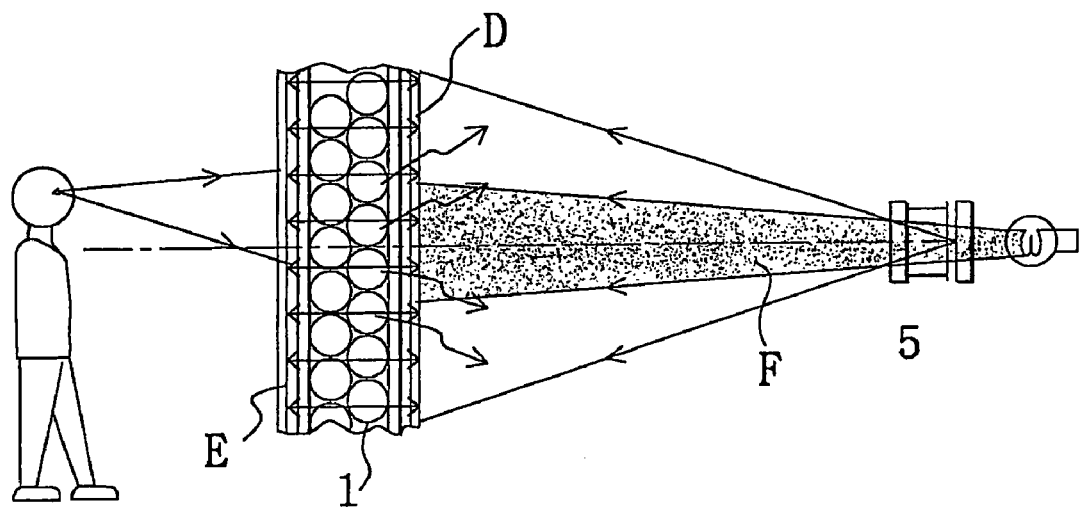
FIG. 6 is a schematic view illustrating elimination of afterglow from a projection light source of the double-sided image film screen in accordance with the present invention.

As shown in FIGS. 3 and 6, an image formed on the incidence plane (D), i.e., the front surface, of the film screen 1 is transmitted toward the exit plane (E), i.e., the rear surface, of the film screen 1, and light emitted from the light source lamp 7 of a projection lens 6 of the projector 5, being distant from the film screen 1, is diffused throughout particle units due to the fine particle size (B) of the silica 2A, thereby eliminating a hot spot (F). Thereby, the image is clearly formed on both surfaces of the film screen 1.

Accordingly, light emitted from the light source lamp 7 of the distant projector 5 is eliminated, and an image formed on the surface of the film screen 1 is uniformly refracted and diffused.

However, in case that the silica 2A has a large particle size (B), the film screen 1 displays an actually transmitted image and has interference generated by foreign matters due to shadows and outlines of large particles of the silica 2A, thus having a low image quality. Consequently, the particle size (B) of the silica 2A is an important factor determining the image quality of the film screen 1.

Further, the silica 2A having a designated particle size (B) serves to diffuse light based on the refractivity thereof. In case that the content (C) of the silica 2A in the film screen 1 is excessively low, a hot spot (F) is generated by the projector 5 and it is difficult to achieve the image division toward the front and rear surfaces of the film screen 1. On the other hand, in case that the content (C) of the silica 2A in the film screen 1 is excessively high, the film screen 1 has a low transmittance, thus being incapable of serving as a transmission-type screen.

In case that the film screen 1 has a high thickness (A), the film screen 1 has a low amount of transmitted light, thus having a difficulty of serving as a double-sided screen. On the other hand, in case that the film screen 1 has a low thickness (A), the film screen 1 has a large amount of transmitted light. However, in case that the film screen 1 has a thickness (A) of 10 μm or less, the film screen 1 has an insufficient supporting power, thus having a limit in practical use.

Hereinafter, table 1 illustrates test results of the film screen 1 containing the silica 2A.

With reference to the below Table 1, in case the content (C) of the silica 2A in the film screen 1 is less than a weight ratio of 800 ppm, the film screen 1 has an excessively low diffusion due to the light refraction, thus generating a hot spot (F). On the other hand, in case that the content (C) of the silica 2A in the film screen is more than a weight ratio of 90,000 ppm, the film screen 1 has an excessively low light transmittance, thus being incapable of serving as a transmission-type screen.

Accordingly, in order to use the film screen 1 of the present invention as a double-sided screen of which an image is displayed on front and rear surfaces, it is preferable that the content (C) of the light-refracting material 2 such as the silica 2A is in the range of 800 ppm to 90,000 ppm.

In case that the particle size (B) of the silica 2A of the film screen 1 is more than 50 μm, the film screen 1 displays an image having a high roughness in view of the results of transmitted light. In case that the particle size (B) of the silica 2A of the film screen 1 is less than 50 μm, interference generated by foreign matters is remarkably reduced. In case that the particle size (B) of the silica 2A of the film screen 1 is less than 10 μm, the film screen 1 displays an image having a low roughness without interference generated by foreign matter, and light division toward both surfaces of the film screen 1 is well achieved.

The finer the particle size (B) of the silica 2A of the film screen 1 is, the lower the roughness of the image displayed on the film screen 1 is. In case that the particle size (B) of the silica 2A of the film screen 1 is less than 0.1 μm, the light refraction and transmission by the silica 2A are excessively low, an image can be displayed only on one surface of the film screen 1.

Accordingly, the particle size (B) of the silica 2A of the film screen 1 of the present invention is in the range of 0.1 μm to 50 μm. The film screen 1 is obtained by thinly printing, depositing or coating one or both surfaces of a transparent film with the above-described silica 2A or one of other light refraction and diffusion materials, made of plastic, which satisfying the above-described condition.

Table 1 illustrates results of light transmittance of the polyester film screen 1 containing the silica 2A having the above-described content (C) and particle size (B) according to the variation in thickness (A) of the polyester film screen 1.

TABLE 1

| Thickness (A) of film screen | Light transmittance |
| --- | --- |
| 20 μm | 80~85% |
| 50 μm | 65~75% |
| 75 μm | 60~70% |
| 100 μm | 50~55% |
| 125 μm | 40~45% |
| 150 μm | 30~35% |
| 200 μm | 20~25% |
| 400 μm | 4.4~10% |

Here, the light transmittance is a transmission index of light by the rear surface of the film screen 1 under the condition that the brightness of an image formed on the front surface of the film screen 1 is 100 when the content of the silica 2A in the film screen 1 is in the range of a weight ratio of 10,000 ppm to a weight ratio of 30,000 ppm. The light transmittance determines whether or not the image is displayed on both surfaces of the film screen 1, and is variably adjusted by the content (C) and the particle size (B) of the silica 2A in the film screen 1.

That is, the light transmittance of the film screen 1 can be variably adjusted by the thickness (A) of the film screen 1 and the content (C) and the particle size (B) of the light-refracting material 2 according to use purposes.

In case that the thickness (A) of the film screen 1 is less than 10 μm, the film screen 1 has a limit in being substantially used due to the excessively small thickness thereof. In case that the thickness (A) of the film screen 1 is more than 400 μm, the film screen 1 has an excessively small light transmittance as shown in Table 1, thus being incapable of serving as a double-sided screen and a roll screen.

Accordingly, the thickness (A) of the film screen 1 containing the silica 2A is in the range of 10 μm to 400 μm.

Based on the above descriptions, the film screen 1 of the present invention has implementation ranges, as follows.

That is, the film screen 1 is designed such that the content (C) of the light-refracting material 2 such as the silica 2A in the film screen 1 is in the range of range of a weight ratio of 800 ppm to a weight ratio of 90,000 ppm, the thickness (A) of the film screen 1 is in the range of 10 μm to 400 μm, and the particle size (B) of the light-refracting material 2 such as the silica 2A is in the range of 0.1 μm to 50 μm.

As described above, the above three factors, i.e., the content (C) and the particle size (B) of the light-refracting material 2 such as the silica 2A and the thickness (A) of the film screen 1, interact mutually and systematically, thus achieving the refraction and transmission of light on both surfaces of the film screen 1 and eliminating the generation of a hot spot (F). Accordingly, compared to the conventional screens, the film screen 1 of the present invention is advantageous in that the film screen displays an image having high visibility and clearness without the generation of the hot spot (F).

First Embodiment

Figure 7:
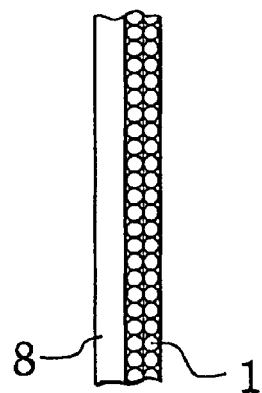
FIG. 7 is a schematic view of a double-sided image film screen, which is attached to a transparent plate, in accordance with a first embodiment of the present invention.

As shown in FIG. 7, a transparent plate 8 is attached to one surface or both surfaces of the film screen 1.

Second Embodiment

Figure 8:
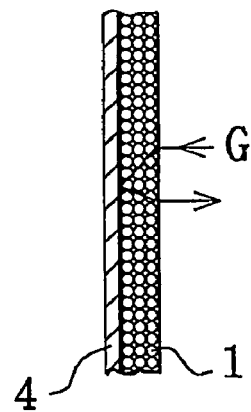
FIG. 8 is a schematic view of a double-sided image film screen, which is attached to a reflection plane, in accordance with a second embodiment of the present invention.

As shown in FIG. 8, a reflection plane 4 such as an aluminum deposition film is formed on or attached to the rear surface of the film screen 1.

In this embodiment, since light transmitted by the rear surface of the film screen 1 is reflected by the reflection plane 4, and then exits through the front surface of the film screen 1, the film screen 1 has a brightness increased in proportion to the increase in the amount of reflected light, and displays a clear image without the generation of the hot spot (H).

Further, the light reflected by the reflection plane 4 increases the ratio of light and darkness in the image formed on the film screen, thereby increasing the visibility of the image.

Third Embodiment

Figure 9:
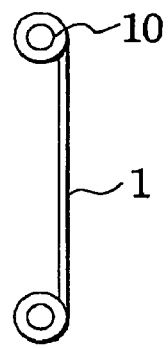
FIG. 9 is a schematic view of a rolled-type double-sided image film screen in accordance with a third embodiment of the present invention.

As shown in FIG. 9, the film screen 1 is rolled by means of rotary rods 10 located at both ends of the film screen, thereby being capable of serving as a roll-type screen.

Fourth Embodiment

Figure 10:
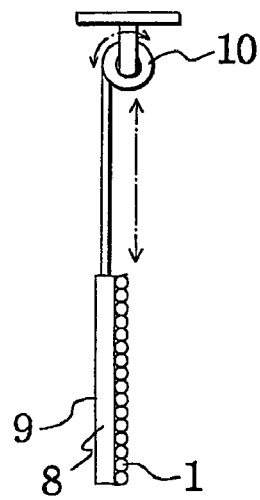
FIG. 10 is a schematic view of a fixed-type double-sided image film screen in accordance with a fourth embodiment of the present invention.

As shown in FIG. 10. the film screen 1 is fixed to a transparent plate 9 so that the film screen 1 can be transferred upward and downward by means of the rotary rod 10.

Fifth Embodiment

Figure 11:
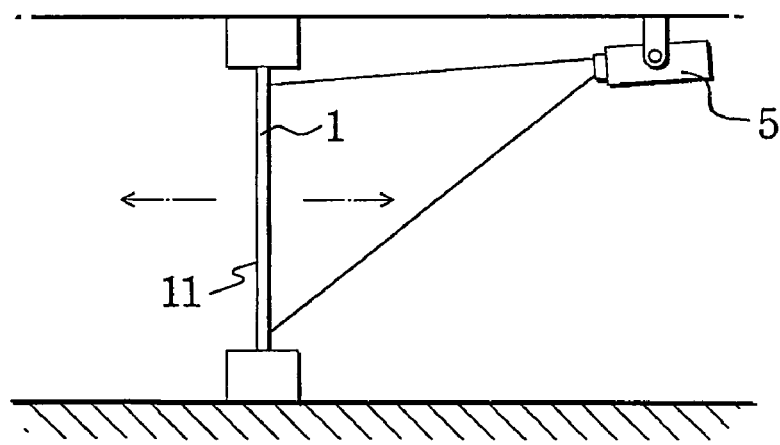
FIG. 11 is a schematic view of a double-sided image film screen, which is applied to a glass window, in accordance with a fifth embodiment of the present invention.

As shown in FIG. 11, the film screen 1 is attached to a glass window 11 so that viewers at outdoor and indoor places can view the image displayed on both surfaces of the film screen 1.

Sixth Embodiment

Figure 12:
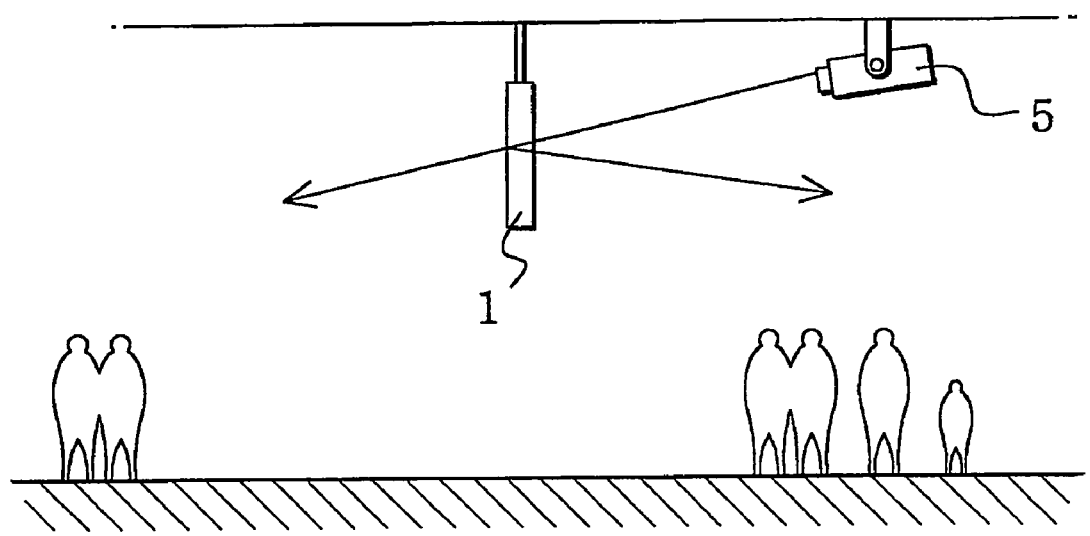
FIG. 12 is a schematic view of a double-sided image film screen, which is installed at a ceiling, in accordance with a sixth embodiment of the present invention.

As shown in FIG. 12, the film screen 1 is installed on the ceiling of an indoor place so that moving people can view the image displayed on both surfaces of the film screen 1.

Seventh Embodiment

Figure 13:
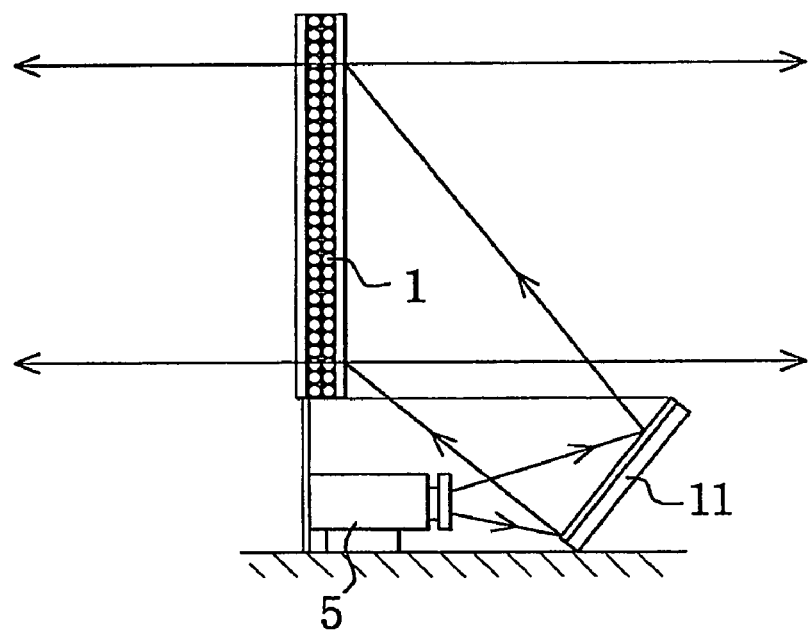
FIG. 13 is a schematic view of a double-sided projector system applying an image film screen in accordance with a seventh embodiment of the present invention.

As shown in FIG. 13, there is prepared a system comprising the film screen 1, a projector 5 under the film screen 1 and a reflecting mirror 11 in front of the projector 5 so that viewer can simultaneously view an image displayed on the front surface of the film screen 1 and an image displayed on the rear surface of the film screen 1.

Eighth Embodiment

Figure 14:
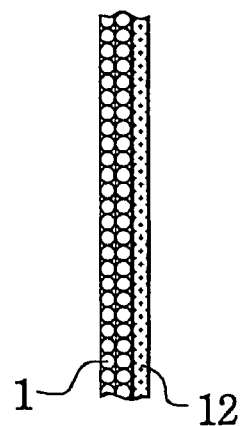
FIG. 14 is a schematic view of a double-sided image film screen, which is provided with a pigment plane attached thereto, in accordance with an eighth embodiment of the present invention.

As shown in FIG. 14, a pigment thin film 12 having a semitransparent dark color such as brown, dark blue, or black is formed on one surface of the film screen 1 of the present invention so as to increase the ratio of light and darkness of incident light to external light.

Ninth Embodiment

Figure 15:
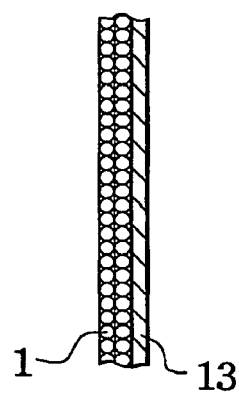
FIG. 15 is a schematic view of a double-sided image film screen, which is provided with a polarizing plate attached thereto, in accordance with a ninth embodiment of the present invention.

As shown in FIG. 15, a polarizing film 13 is attached to one surface of the film screen 1 of the present invention.

The polarizing film 14 serves to strongly deflect external light, thereby improving the visibility of an image formed on the film screen 1 and allowing the film screen 1 to serve as a stereoscopic screen. Particularly, in this case, the film screen 1 serves as a double-sided stereoscopic screen, of which viewers can view a stereoscopic image displayed on both surfaces, i.e., the front and rear surfaces of the film screen 1.

Tenth Embodiment

Under the condition that three factors of the film screen 1, such as the thickness (A) of the film screen 1, the content (C) and the particle size (B) of the light-refracting material 2 in the film screen 1, are limited in the above-described allowable ranges, the film screen 1 is divided into front and rear sub-screens centering on the transparent plate 9.

Figure 16:
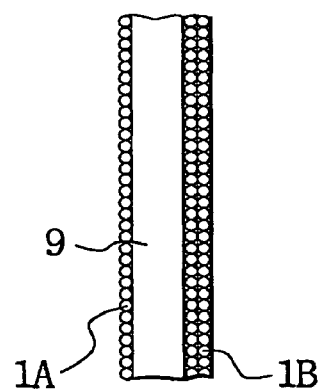
FIG. 16 is a schematic view of a double-sided image film screen comprising front and rear film sub-screens connected to each other in accordance with a tenth embodiment of the present invention.

That is, as shown in FIG. 16, for example, in case that the thickness of each of the transparent plate 9, a front film sub-screen 1A and a rear film sub-screen 1B is 200 μm, the content (C) of the light-refracting material 2 in each of the front and rear film sub-screens 1A and 1B is a weight ratio of 30,000 ppm, and the particle size (B) of the light-refracting material 2 is 10 μm, the total thickness of the front and rear film sub-screens 1A and 1B is 400 μm, the total content (C) of the light-refracting material 2 in the front and rear film sub-screens 1A and 1B is a weight ratio of 60,000 ppm, and the particle size (B) of the light-refracting material 2 contained in the front and rear film sub-screens 1A and 1B is 10 μm.

Accordingly, the three factors of the film screen 1 shown in FIG. 16 satisfy the allowable ranges in accordance with the present invention.

Instead of the above-described silica 2A, the light-refracting material 2 may be titania ($TiO_2$) having the same transmittance and refractivity as those of the silica 2A, thereby allowing the film screen to display an image on both surfaces thereof.

INDUSTRIAL APPLICABILITY

As described above, as shown in FIGS. 4a and 4b, incident light is transmitted by the silica 2A having a high transmittance contained in the film screen 1 made of transparent plastic.

Since the content (C) of the light-refracting material 2 such as silica 2A is in the range of range of a weight ratio of 800 ppm to a weight ratio of 90,000 ppm, the thickness (A) of the film screen 1 is in the range of 10 μm to 400 μm, and the particle size (B) of silica 2A is in the range of 0.5 μm to 50 μm, the incident light is transmitted and refracted by the fine particles of silica 2A having the above particle size (B). That is, the incident light is transmitted and refracted into fine units having a size of 0.5 μm to 50 μm, thereby allowing the film screen 1 to display an image through front and rear surfaces thereof.

The incident light is diffused toward several directions in the fine units by the multi-layered fine particles of silica 2A having a refractivity of 1.4 or more contained in the film screen 1 having the thickness (A), thus being diffused toward the front and rear surfaces of the film screen 1. That is, since the refractivity of silica 2A is 1.4 or more, the incident light is diffused into fine units based on the refractivity of silica 2A, thereby allowing an image formed on the film screen 1 to be displayed through the front and rear surfaces of the film screen 1. Instead of silica 2A, other materials having a refractivity of 1.4 or more and satisfying three factors of the film screen 1 of the present invention may be used as the light-refracting material 2.

The above film screen 1 of the present invention displays the image projected from a projector 5 and formed thereon through front and rear surfaces thereof. Accordingly, compared to conventional screens, the film screen 1 is advantageous in that it simultaneously serves as a front screen as viewed from the front side, as a rear screen as viewed from the rear side using a transmission method, and as a double-sided screen as viewed from front and rear sides.

Further, as shown in FIGS. 3 and 6, the incident light onto the surface on the film screen 1 is transmitted and afterglow of a light source from the distant projector is scattered by the light-refracting material 2, having a fine particle size (B), of the film screen 1. Accordingly, the film screen 1 of the present invention displays an image having a high uniformity without the generation of a hot spot (F).

Moreover, an image formed on the film screen by transmitting the incident light through the silica 2A having the fine particle size (B) contained in the film screen 1 does not glimmer, thus being displayed with a high visibility.

Figure 2:
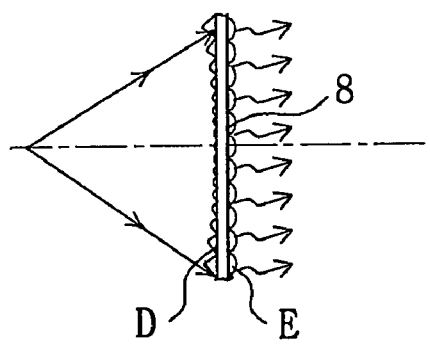
FIG. 2 is a schematic view of a conventional Fresnel transmission-type screen.

Differing from the conventional screens, shown in FIGS. 1 and 2, which transmit and then scatter light or converge and then scatter light, the film screen 1 of the present invention simultaneously transmits and refracts incident light into fine units by means of the silica 2A having the fine particle size (B), and reflects the light toward the front and rear surfaces of the film screen 1, thus displaying an image through the front and rear surfaces of the film screen 1 using a single projector.

The film screen 1 of the present invention eliminates a hot spot (F), which was generated by afterglow of light projected from the projector 5 in a conventional high-luminance flat reflection-type screen, thus being capable of serving as a reflection-type screen.

As shown in FIG. 11, the film screen of the present invention, which is attached to a glass window, can be viewed outdoors and indoors simultaneously, thus being applied to outdoor and indoor advertisement or image displays.

As shown in FIG. 12, the film screen of the present invention, which is installed at a ceiling, can be applied to double-sided advertisement displays arranged at terminals, underground shopping centers, and large-sized shopping centers.

As shown in FIG. 13, the double-sided film screen of the present invention, which is operated by one system, can be applied to double-sided advertisement displays arranged at front doors of shops and department stores.

As shown in FIG. 16, in case that two film screens of the present invention having different thicknesses (A) are connected such that a front surface of one film screen is attached to a rear surface of the other film screen, the difference of brightness between the front and rear film screens is variously determined by adjusting the thicknesses (A) the of the front and rear film screens according to purposes.

More specifically, as shown in FIG. 16, the film screen 1 comprises a front film sub-screen 1A and a rear film sub-screen 1B, centering on a transparent plate 9. Here, since the total thickness (A) of the front and rear film sub-screens 1A and 1B, the total content (C) of the light-refracting material 2 in the front and rear film sub-screens 1A and 1B, and the particle size (B) of the light-refracting material 2 contained in the front and rear film sub-screens 1A and 1B satisfy the above-described allowable ranges, the film screen 1 serves as a double-sided image film screen.

As apparent from the above description, the present invention provides a double-sided image film screen, in which a content (C) and a particle size (B) of a light-refracting material and a thickness of the film screen mutually interact so that an image formed on the film screen by means of light projected from a projector is dividedly displayed on front and rear surfaces of the film screen, thereby being advantageous in that the film screen of the present invention displays the image through the front and rear surfaces thereof, compared to conventional transmission-type and reflection-type screens, and increasing the visibility of the displayed imaged. Accordingly, the double-sided image film screen of the present invention is applied to double-sided advertisement and image displays, educational screens, screens for home theaters, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A double-sided image film screen for an image projector, having a thickness (A) of 10 µm to 400 µm, and comprising:
    a transparent material; and
    a light-refracting material contained in or deposited on the transparent material at each side of the film screen,
    wherein the light-refracting material has a an index of refraction of 2.5 to 3.0;
    wherein the light-refracting material has a content (C) ranging from a weight ratio of 800 ppm to a weight ratio of 90,000 ppm; and
    wherein the thickness (A) of the film screen, the index of refraction of the light-refracting material, and the content (C) of the of the light-refracting material mutually interact such that an image projected from a single projector is dividedly displayed on front and rear surfaces of the film screen, to enable simultaneous display of the image at the front and rear surfaces of the film screen while eliminating a hot spot.

2. The double-sided image film screen as set forth in claim 1, wherein:
    the particle size (B) of the light-refracting material is in the range of 0.1 µm to 50µm.

3. The double-sided image film screen as set forth in claim 1 or 2, wherein:
    a rotary rod is installed at an upper end of the film screen; and
    the film screen is rolled up into and down from the rotary rod, and serves as a rolled-type screen.

4. The double-sided image film screen as set forth in claim 1 or 2,
    wherein the film screen is attached to a glass window so that viewers at outdoor and indoor places can view the film screen through both surfaces thereof.

5. The double-sided image film screen as set forth in claim 1,
    wherein the film screen is fixed to a transparent plate so that the film screen can be transferred upward and downward by means of a rotary rod.

6. The double-sided image film screen as set forth in claim 1,
    wherein a projector is installed under the film screen and a reflecting mirror is installed in front of the projector to prepare one video system so that viewers can view an image displayed on the front and rear surfaces of the film screen.

7. The double-sided image film screen as set forth in claim 1,
    wherein the film screen is divided into front and rear film sub-screens centering on a transparent plate under the condition that the total thickness of the film screen, the content and the particle size of the light-refracting material in the film screen satisfy the allowable ranges.

* * * * *